(12) United States Patent
Kim (10) Patent No.: US 12,304,556 B2
(45) Date of Patent: May 20, 2025

(54) METHOD FOR DIAGNOSING STATUS OF MOTOR DRIVEN POWER STEERING AND ELECTRONIC DEVICE THEREOF

(71) Applicant: HYUNDAI MOBIS CO., LTD., Seoul (KR)

(72) Inventor: Tae Hong Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 1050 days.

(21) Appl. No.: 17/313,476

(22) Filed: May 6, 2021

(65) Prior Publication Data

US 2021/0354757 A1 Nov. 18, 2021

(30) Foreign Application Priority Data

May 13, 2020 (KR) ........................ 10-2020-0056973

(51) Int. Cl.
*B62D 15/02* (2006.01)
*B60Q 9/00* (2006.01)
*B62D 3/12* (2006.01)
*G01D 5/14* (2006.01)
*G01M 13/023* (2019.01)
*G07C 5/08* (2006.01)

(52) U.S. Cl.
CPC ............ *B62D 15/0235* (2013.01); *B60Q 9/00* (2013.01); *B62D 3/12* (2013.01); *G01D 5/145* (2013.01); *G01M 13/023* (2013.01); *G07C 5/0808* (2013.01)

(58) Field of Classification Search
CPC ........ B62D 15/0235; B62D 3/12; B60Q 9/00; G01D 5/145; G01M 13/02; G07C 5/0808
See application file for complete search history.

(56) References Cited

U.S. PATENT DOCUMENTS 9,464,697 B2 * 10/2016 Antchak .................. F16H 7/12

FOREIGN PATENT DOCUMENTS

KR 10-2018-0056431 A 5/2018

OTHER PUBLICATIONS

How to Tell If Your Power Steering Belt Needs Replacing, https://www.huntingtonbeachford.com/blogs/2919/huntington-beach-ford-service/how-to-tell-if-your-power-steering-belt-needs-replacing/ (Year: 2019).*
Powersteering, 2019 (Year: 2019).*

* cited by examiner

*Primary Examiner* — Aryan E Weisenfeld
(74) *Attorney, Agent, or Firm* — NSIP Law (57) ABSTRACT

An electronic device may include: a first sensor module configured to measure a steering angle of a motor driven power steering (MDPS); a second sensor module configured to measure a steering angle of a motor of the MDPS; a memory; and a processor coupled to the first sensor module, the second sensor module and the memory. The processor may be configured to, in response to a vehicle being started: synchronize a first steering angle measured through the first sensor module with a second steering angle measured through the second sensor module; determine a weight based on a load applied to the MDPS; apply the weight to a difference value between the first and second steering angles; and diagnose a status of a belt of the MDPS based on the difference value to which the weight is applied.

15 Claims, 5 Drawing Sheets

METHOD FOR DIAGNOSING STATUS OF MOTOR DRIVEN POWER STEERING AND ELECTRONIC DEVICE THEREOF

CROSS-REFERENCE TO RELATED APPLICATION

This application claims the benefit under 35 U.S.C. § 119(a) of Korean Patent Application No. 10-2020-0056973 filed on May 13, 2020, the entire disclosure of which is incorporated herein by reference for all purposes.

BACKGROUND

Field

Exemplary embodiments of the present disclosure relate to a method for diagnosing the status of an MDPS (Motor Driven Power Steering), and an electronic device therefor.

Discussion of the Background

Recently, vehicles are provided with various functions for providing convenience for a driver. In order to implement such functions, various high-tech sensors and electronic control units are mounted in the vehicles. For example, the vehicles are equipped with an MDPS (Motor Driven Power Steering) that helps a driver to easily operate a steering wheel. Such an MDPS may function to assist a driver to perform a steering operation, using a motor.

The related art of the present disclosure is disclosed in Korean Patent Application Laid-Open No. 2018-0056431 published on May 29, 2018 and entitled "Layout Structure of R-MDPS for Vehicle".

Figure 1:
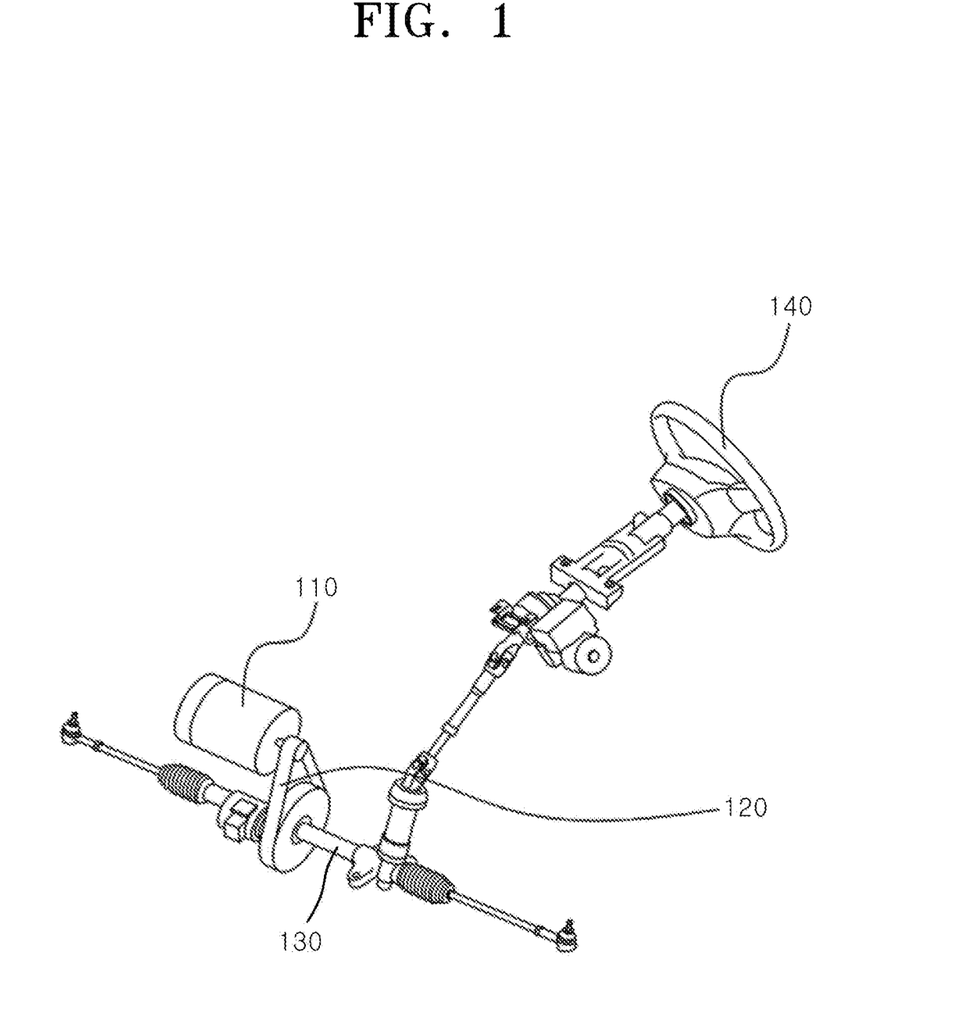
FIG. 1 is a diagram illustrating the environment of an R-MDPS in accordance with various embodiments.

As illustrated in FIG. 1, an R (Rack mounted)-MDPS may transfer torque, generated through a motor 110, to a rack bar 130 through a belt 120, thereby assisting a driver to steer the vehicle through an operation of a steering wheel 140. Since the R-MDPS transfers the power of the motor to the rack bar through the belt 120, the R-MDPS may be affected by a slip of the belt 120. Thus, research is being conducted on a method for determining the status of the belt 120 by acquiring a steering angle by the operation of the steering wheel 140 and a steering angle by the rotation of the motor 110 and calculating the difference value between the two steering angles, in order to sense a slip of the belt 120. When the difference value between the steering angle by the operation of the steering wheel 140 and the steering angle by the rotation of the motor 110 is not more than a predetermined value, the above-described method does not determine that the belt 120 broke down, and thus cannot sense cumulative damage to the belt 120, caused by steering angle difference values equal to or less than the predetermined value. Therefore, the R-MDPS may require a solution that can sense a slip of the belt 120 or cumulative damage to the belt 120 in advance.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an electronic device includes: a first sensor module configured to measure a steering angle of a motor driven power steering (MDPS); a second sensor module configured to measure a steering angle of a motor of the MDPS; a memory; and a processor coupled to the first sensor module, the second sensor module and the memory. The processor is configured to, in response to a vehicle being started: synchronize a first steering angle measured through the first sensor module with a second steering angle measured through the second sensor module; determine a weight based on a load applied to the MDPS; apply the weight to a difference value between the first and second steering angles; and diagnose a status of a belt of the MDPS based on the difference value to which the weight is applied.

The first sensor module may include a steering angle sensor. The second sensor module may include a hall sensor.

The processor may be further configured to synchronize the first and second steering angles by: subtracting a torsion angle of a torsion bar from the first steering angle; and synchronizing the first steering angle, from which the torsion angle is subtracted, with the second steering angle, in consideration of a gear ratio.

The MDPS may include a rack-mounted MDPS (R-MPDS). The gear ratio may be determined based on a C-factor of the R-MDPS, a lead distance per tooth in a rack bar, and a belt pulley ratio.

The electronic device may further include a third sensor module configured to measure a column torque, a yaw value of the vehicle, or lateral acceleration of the vehicle. The processor may be further configured to determine the weight by: identifying a load applied to the MDPS based on a sensing value of the third sensor module; and determining the weight based on the identified load. A value of the weight may decrease as the load applied to the MPDS is increased.

The process may be further configured to apply the weight by: subtracting a torsion angle of a torsion bar from the first steering angle, calculating a difference value between the first steering angle, from which the torsion angle is subtracted, and the second steering angle; applying the weight by multiplying the difference value by the weight; and accumulating and storing the difference value, to which the weight is applied, in the memory.

The processor may be further configured to diagnose the status of the belt of the MDPS by: determining that a belt slip has occurred, in response to the difference value accumulated and stored in the memory being equal to or greater than a threshold value; and determining that no belt slip has occurred, in response to the difference value accumulated and stored in the memory being less than the threshold value.

The processor may be further configured to: limit at least some of driving functions of the vehicle, in response to determining that the belt slip has occurred; and synchronize the second steering angle with the first steering angle, in response to determining that no belt slip has occurred.

The electronic device may further include a communication circuit coupled to the processor. The processor may be further configured to transmit, in response to determining that the belt slip has occurred, information indicating that the belt slip occurred to an external electronic device through the communication circuit, in order to inform a driver of the vehicle that the belt slip has occurred.

In another general aspect, a method of operating an electronic device includes: synchronizing, by a processor of the electronic device, a first steering angle measured through a first sensor module of the electronic device with a second steering angle measured through a second sensor module of the electronic device, in response to a vehicle being started; determining, by the processor, a weight based on a load applied to a motor driven power steering (MDPS); applying, by the processor, the weight to a difference value between the first steering angle and the second steering angle; and diagnosing, by the processor, a status of a belt of the MDPS based on the difference value to which the weight is applied. The first sensor module is configured to measure a steering angle of the MDPS. The second sensor module is configured to measure a steering angle of a motor of the MDPS.

The first sensor module may include a steering angle sensor. The second sensor module may include a hall sensor.

The synchronizing of the first and second steering angles may include: subtracting, by the processor, a torsion angle of a torsion bar from the first steering angle; and synchronizing, by the processor, the first steering angle, from which the torsion angle is subtracted, with the second steering angle, in consideration of a gear ratio.

The MDPS may include a rack-mounted MPDS (R-MPDS). The gear ratio may be determined based on a C-factor of the R-MDPS, a lead distance per tooth in a rack bar, and a belt pulley ratio.

The deciding of the weight may include: identifying, by the processor, a load applied to the MDPS based on a sensing value of a third sensor module of the electronic device; and deciding, by the processor, the weight based on the identified load. The third sensor module may measure column torque, a yaw value of the vehicle, or lateral acceleration of the vehicle. A value of the weight may decrease as the load applied to the MPDS is increased.

The applying of the weight may include: subtracting, by the processor, a torsion angle of a torsion bar from the first steering angle; calculating, by the processor, a difference value between the first steering angle, from which the torsion angle is subtracted, with the second steering angle; applying, by the processor, the weight by multiplying the weight by the difference value; and accumulating and storing, by the processor, the difference value, to which the weight is applied, in a memory of the electronic device.

The diagnosing of the status of the belt of the MDPS may include: determining, by the processor, that a belt slip has occurred, in response to the difference value accumulated and stored in the memory being equal to or greater than a threshold value; and determining, by the processor, that no belt slip has occurred, in response to the difference value accumulated and stored in the memory being less than the threshold value.

The method may further include: limiting, by the processor, at least some of driving functions of the vehicle, in response to determining that the belt slip has occurred; and synchronizing, by the processor, the second steering angle with the first steering angle, in response to determining that no belt slip has occurred.

The method may further include transmitting, by the processor, information indicating that the belt slip has occurred to an external electronic device through a communication circuit of the electronic device, in response to determining that the belt slip has occurred, in order to inform a driver of the vehicle that the belt slip has occurred.

In another general aspect, a non-transitory, computer-readable storage medium stores instructions that, when executed by a processor, cause the processor to: synchronize a first steering angle measured through a first sensor module of an electronic device with a second steering angle measured through a second sensor module of the electronic device, in response to a vehicle being started; determine a weight based on a load applied to a motor driven power steering (MDPS); apply the weight to a difference value between the first steering angle and the second steering angle; and diagnose a status of a belt of the MDPS based on the difference value to which the weight is applied. The first sensor module is configured to measure a steering angle of the MDPS. The second sensor module is configured to measure a steering angle of a motor of the MDPS.

Other features and aspects will be apparent from the following detailed description, the drawings, and the claims.

DETAILED DESCRIPTION OF THE ILLUSTRATED EMBODIMENTS

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereafter, various embodiments of this specification will be described with reference to the accompanying drawings. It should be understood that the embodiments and the terms used therein are not intended to limit the technology described in this specification to specific embodiments, and include various modifications, equivalents and/or substitutes of the embodiments. In connection with the descriptions of the drawings, like components may be represented by like reference numerals. The terms of a singular form may include plural forms unless otherwise specified. In this document, an expression "A or B" or "one or more of A and/or B" may include all available combinations of items listed with A and B. Expressions such as "first" and "second" may modify the corresponding components regardless of the order or importance thereof. The expressions may be only used to distinguish one component from another component, and do not limit the corresponding components. When a certain component (e.g. first component) is referred to as being "(functionally or communicatively) coupled" or "connected" to another component (e.g. second component), it may indicate that the certain component is directly coupled to the another component, or coupled to the another component through still another component (e.g. third component).

In this document, the term "configured or set to" may be used interchangeably with "suitable for", "having an ability of", "changed to", "manufactured to", "capable of" or "designed to" in hardware or software, for example. In a certain situation, an expression "device configured to" may indicate that the device "can perform" with another device or other parts. For example, a sentence "processor configured or set to perform A, B and C" may indicate a dedicated processor (e.g. embedded processor) for performing the corresponding operations, or a general-purpose processor (e.g. CPU or application processor) capable of performing the corresponding operations by executing one or more software programs stored in a memory device.

Figure 2:
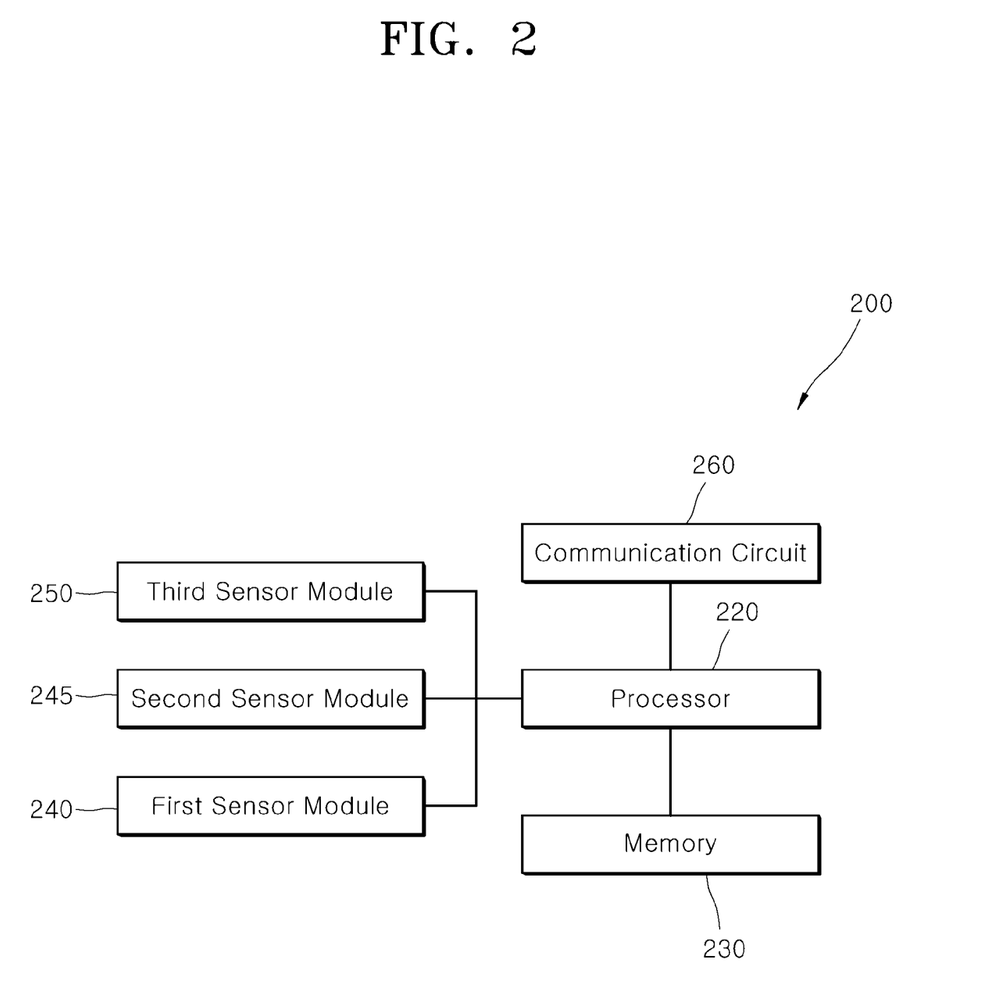
FIG. 2 is a block diagram illustrating an electronic device for diagnosing the status of an MDPS in accordance with various embodiments.
Figure 3:
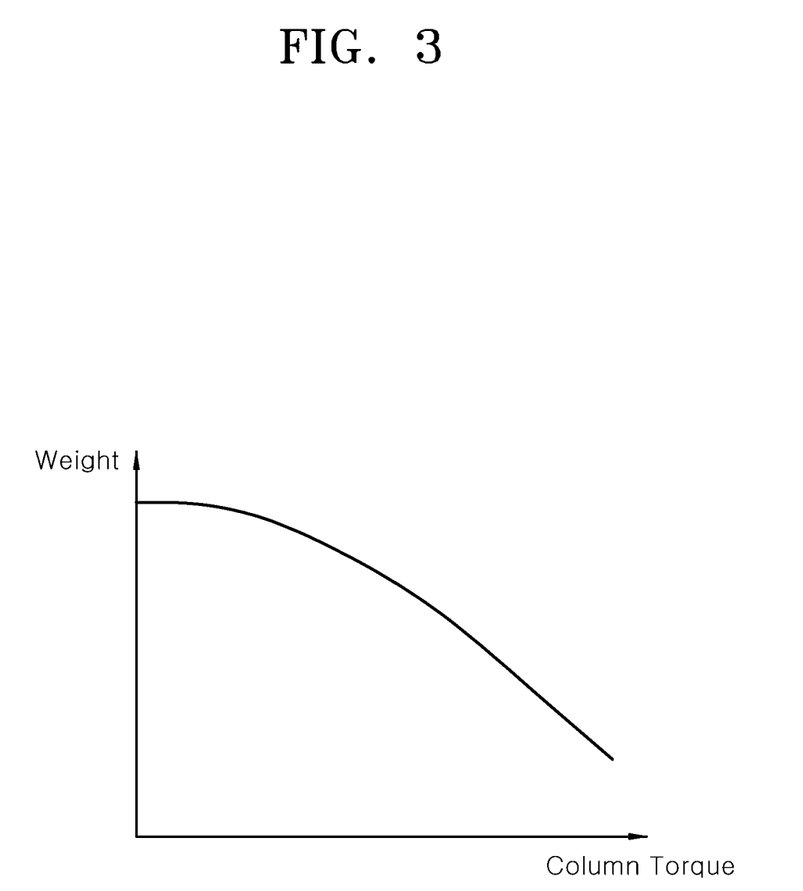
FIG. 3 is a graph illustrating an example of a weight in accordance with various embodiments.

FIG. 2 is a block diagram illustrating an electronic device for diagnosing the status of an MDPS in accordance with various embodiments. FIG. 3 is a graph illustrating an example of a weight in accordance with various embodiments.

Referring to FIGS. 2 and 3, an electronic device 200 may include a processor 220, a memory 230, a first sensor module 240, a second sensor module 245, a third sensor module 250 and a communication circuit 260. However, the configuration of the electronic device is not limited thereto. For example, the electronic device 200 may further include an input unit (not illustrated) for receiving an input and/or an output unit (not illustrated) for outputting information.

In accordance with various embodiments, the processor 220 may execute software to control one or more other components (e.g. hardware or software components) of the electronic device 200, coupled to the processor 220, and perform various data processing operations or calculations. In accordance with an embodiment, as at least a part of the data processing operations or calculations, the processor 220 may load a command or data, received from another component (e.g. the first sensor module 240, the second sensor module 245 or the communication circuit 260), to the memory 230, process the command or data stored in the memory 230, and store the result data in the memory 230. In accordance with an embodiment, the processor 220 may include a main processor (e.g. CPU or application processor) and an auxiliary processor (e.g. communication processor) which can be operated independently of or together with the main processor. Additionally or alternatively, the auxiliary processor may be configured to use a smaller amount of power than the main processor or specialize in a designated function. The auxiliary processor may be implemented separately from the main processor or implemented as a part of the main processor.

In accordance with various embodiments, the auxiliary processor may control at least some of functions or statuses related to one or more components (for example, the first sensor module 240, the second sensor module 245 or the communication circuit 260) of the components of the electronic device 200, in place of the main processor while the main processor is inactivated (e.g. sleep) or together with the main processor while the main processor is activated (e.g. application execution).

In accordance with various embodiments, when a vehicle is started, the processor 220 may synchronize a first steering angle measured through the first sensor module 240 with a second steering angle measured through the second sensor module 245. For example, when the vehicle is started, the processor 220 may measure the first steering angle by a driver's steering wheel operation through the first sensor module 240 and measure the second steering angle by the rotation of a motor (e.g. the motor 110 of FIG. 1) through the second sensor module 245. Then, the processor 220 may subtract the torsion angle of a torsion bar from the measured first steering angle, and synchronize the first steering angle, from which the torsion angle is subtracted, with the second steering angle in consideration of a gear ratio. Specifically, the processor 220 may perform the synchronization by dividing the second steering angle by the gear ratio and then matching the division result with the first steering angle, from which the torsion angle is subtracted. In accordance with an embodiment, the gear ratio may be decided based on a C-factor of an R-MDPS, a lead distance per tooth in a rack bar and a belt pulley ratio. For example, the gear ratio may be calculated through Equation 1 below.

$$\text{Gear Ratio} = (\text{C-Factor} * \text{Pulley Ratio})/\text{Lead Distance} \quad [\text{Equation 1}]$$

In accordance with various embodiments, the processor 220 may identify a load applied to the MDPS. For example, the processor 220 may measure column torque through the third sensor module 250, and identify a load applied to the MDPS based on the measured column torque. In this case, the processor 220 may determine that the larger the column torque value, the larger the load applied to the MDPS. For another example, the processor 220 may measure a yaw value of the vehicle through the third sensor module 250, and identify a load applied to the MDPS based on the measured yaw value. In this case, the processor 220 may determine that the larger the yaw value, the larger the load applied to the MDPS. For another example, the processor 220 may measure lateral acceleration of the vehicle through the third sensor module 250, and identify a load applied to the MDPS based on the measured lateral acceleration. In this case, the processor 220 may determine that the larger the lateral acceleration value, the larger the load applied to the MDPS.

In accordance with various embodiments, the processor 220 may decide a weight based on the load applied to the MDPS. Specifically, the processor 220 may decide a weight that has a smaller value as the load applied to the MDPS is increased, in order to more sensitively determine a belt slip as a large load is applied to the MDPS, and to more insensitively determine a belt slip as a small load is applied to the MDPS. For example, when the processor 220 decides a weight based on column torque, the processor 220 may decide a weight that has a large value as the column torque decreases, as illustrated in FIG. 3.

In accordance with various embodiments, the processor 220 may diagnose the status of a belt (e.g. the belt 120 of FIG. 1) of the MDPS based on a difference value between the first steering angle measured through the first sensor module 240 and the second steering angle measured through the second sensor module 245. Specifically, the processor 220 may measure the first steering angle and the second steering angle through the first sensor module 240 and the second sensor module 245, subtract the torsion angle of the torsion bar from the first steering angle, apply the weight to a difference value between the first steering angle, from which the torsion angle is subtracted, and the second steering angle, and store the result value in the memory 230. Then, the processor 220 may determine whether the cumulatively stored difference value is equal to or more than a threshold value, in order to diagnose the status of the belt. In this case, the processor 220 may determine that a belt slip occurred, when the cumulatively stored difference value is equal to or more than the preset threshold value, and determine that no belt slip occurred, when the cumulatively stored difference value is less than the preset threshold value.

In accordance with various embodiments, when a belt slip is detected, the processor 220 may limit at least some of driving functions of the vehicle (e.g. fail-safe operation). For example, when a belt slip is detected while the vehicle performs autonomous driving, the processor 220 may stop the autonomous driving of the vehicle. For another example, when a belt slip is detected while the vehicle performs normal driving, the processor 220 may limit the function of the MDPS. In accordance with an embodiment, when a belt slip is detected, the processor 220 may output information, indicating that the belt slip was detected, to an external electronic device (e.g. a display device and/or speaker inside the vehicle) through the communication circuit 260, such that the driver of the vehicle can recognize the belt slip.

In accordance with various embodiments, the memory 230 may store various data used by one or more components (e.g. the processor 220, the first sensor module 240 or the second sensor module 245) of the electronic device 200. For example, the data may include software and input data or output data on a command related to the software. The memory 230 may include a volatile memory or nonvolatile memory.

In accordance with various embodiments, the first sensor module 240 may measure the first steering angle by a driver's steering wheel operation, and provide the measured first steering angle to the processor 220. In accordance with an embodiment, the first sensor module 240 may include a steering angle sensor for measuring a steering angle.

In accordance with various embodiments, the second sensor module 245 may measure the second steering angle by the rotation of the motor (e.g. the motor 110 of FIG. 1) of the MDPS, and provide the measured second steering angle to the processor 220. In accordance with an embodiment, the second sensor module 245 may include a hall sensor.

In accordance with various embodiments, the third sensor module 250 may measure the column torque, and provide the measured column torque to the processor 220. In accordance with an embodiment, the third sensor module 250 may include a torque sensor.

In accordance with various embodiments, the third sensor module 250 may measure the yaw value of the vehicle, and provide the measured yaw value to the processor 220. In accordance with an embodiment, the third sensor module 250 may include a yaw rate sensor.

In accordance with various embodiments, the third sensor module 250 may measure the lateral acceleration of the vehicle, and provide the measured lateral acceleration to the processor 220. In accordance with an embodiment, the third sensor module 250 may include a lateral acceleration sensor.

In accordance with various embodiments, the communication circuit 260 may establish a communication channel (e.g. wired communication channel and/or wireless communication channel) for data communication between the electronic device 200 and another electronic device. In accordance with an embodiment, the communication circuit 260 may support CAN (Controller Area Network) communication.

As described above, the electronic device 200 may adjust detection sensitivity to a belt slip in consideration of the load of the MDPS, thereby maximizing the fail diagnosis performance for the belt.

Figure 4:
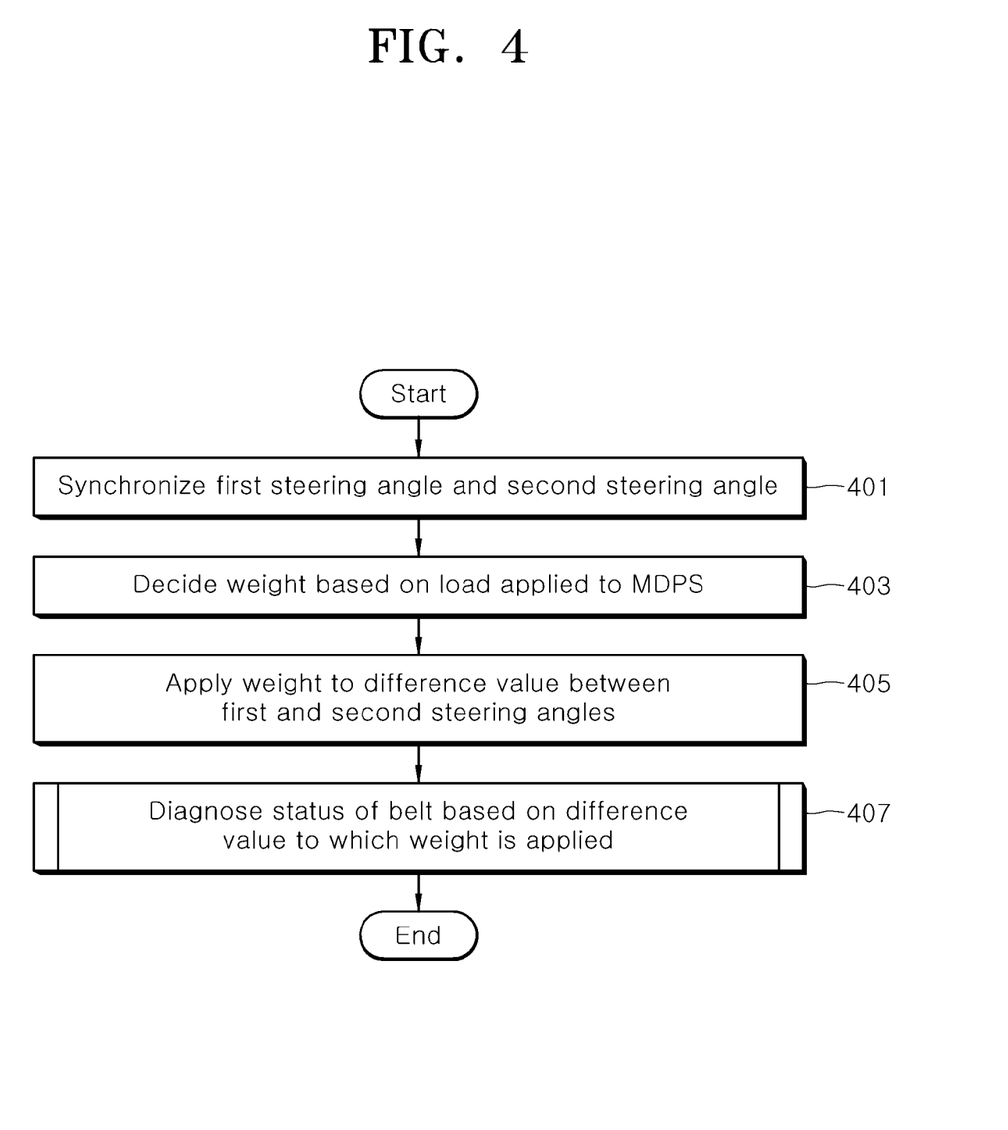
FIG. 4 is a flowchart for describing a method for diagnosing the status of an MDPS in an electronic device in accordance with various embodiments.

FIG. 4 is a flowchart for describing a method for diagnosing the status of an MDPS in an electronic device in accordance with various embodiments.

Referring to FIG. 4, the processor (e.g. the processor 220 of FIG. 2) of the electronic device (e.g. the electronic device 200 of FIG. 2) may synchronize a first steering angle with a second steering angle in operation 401. For example, when a vehicle is started, the processor 220 may measure the first steering angle by a driver's steering wheel operation through the first sensor module 240, and measure the second steering angle by the rotation of the motor (e.g. the motor 110 of FIG. 1) of the MDPS through the second sensor module 245. Then, the processor 220 may subtract a torsion angle of the torsion bar from the first steering angle, and synchronize the first steering angle, from which the torsion angle is subtracted, with the second steering angle in consideration of a gear ratio.

In operation 403, the processor 220 may decide a weight based on a load applied to the MDPS. For example, the processor 220 may measure column torque, a yaw value of the vehicle or lateral acceleration of the vehicle through the third sensor module 250, determine the load applied to the MDPS based on the column torque, the yaw value of the vehicle or the lateral acceleration of the vehicle, and decide the weight based on the determination result. In accordance with an embodiment, the processor 220 may determine that the larger the column torque, the yaw value of the vehicle or the lateral acceleration of the vehicle, the larger the load applied to the MDPS. In accordance with an embodiment, the weight may have a smaller value as the load applied to the MDPS is increased.

In operation 405, the processor 220 may apply the weight to a difference value between the first and second steering angles. For example, the processor 220 may measure the first steering angle through the first sensor module 240, and measure the second steering angle through the second sensor module 245. Then, the processor 220 may subtract the torsion angle of the torsion bar from the first steering angle, calculate a difference value between the first steering angle, from which the torsion angle of the torsion bar is subtracted, and the second steering angle, and apply (e.g. multiply) the weight to the calculated difference value. The processor 220 may accumulate and store the difference value, to which the weight is applied, in the memory 230.

In operation 407, the processor 220 may diagnose the status of the belt based on the difference value to which the weight is applied. For example, the processor 220 may determine whether the difference value accumulated and stored in the memory 230 is equal to or more than the threshold value, and diagnose the status of the belt based on the determination result. Specifically, the processor 220 may determine that a belt slip occurred, when the difference value accumulated and stored in the memory 230 is equal to or more than the threshold value, and determine that no belt slip occurred, when the difference value accumulated and stored in the memory 230 is less than the threshold value. In accordance with an embodiment, the processor 220 may limit at least some of the driving functions of the vehicle when a belt slip occurred. For example, when a belt slip is detected while the vehicle performs autonomous driving, the processor 220 may stop the autonomous driving of the vehicle. For another example, when a belt slip is detected while the vehicle performs normal driving, the processor 220 may limit the function of the MDPS. In accordance with an embodiment, when a belt slip is detected, the processor 220 may output information, indicating that the belt slip was detected, to an external electronic device (e.g. a display device and/or speaker inside the vehicle) through the communication circuit 260, such that the driver of the vehicle can recognize the belt slip.

As described above, the electronic device 200 may adjust detection sensitivity to a belt slip in consideration of the load of the MDPS, thereby maximizing the fail diagnosis performance for the belt.

Figure 5:
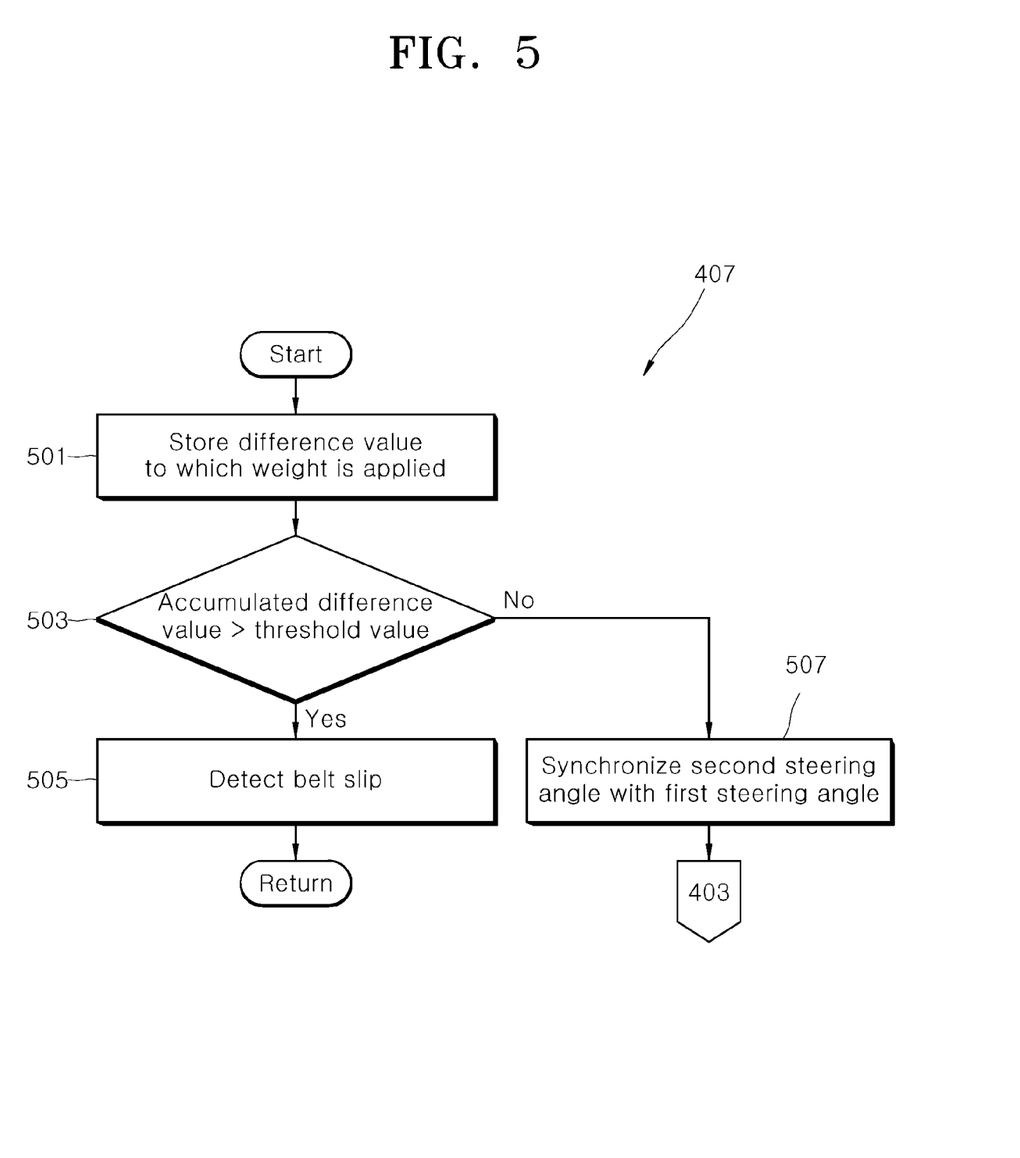
FIG. 5 is a flowchart for describing a method for diagnosing the status of a belt in an electronic device in accordance with various embodiments.

FIG. 5 is a flowchart for describing a method for diagnosing the status of a belt in an electronic device in accordance with various embodiments. The following descriptions may be made based on the details of the operation for diagnosing the status of the belt based on the difference value to which the weight is applied, in operation 407 of FIG. 4.

Referring to FIG. 5, the processor (e.g. the processor 220 of FIG. 2) of the electronic device (e.g. the electronic device 200 of FIG. 2) may store the difference value, to which the weight is applied, in the memory 230 in operation 501. In accordance with an embodiment, the difference value to which the weight is applied may be accumulated and stored in the memory 230.

In operation 503, the processor 220 may determine whether the difference value accumulated and stored in the memory 230 is equal to or more than the threshold value. The processor 220 may perform operation 505 when the difference value accumulated and stored in the memory 230 is equal to or more than the threshold value, and perform operation 507 when the difference value accumulated and stored in the memory 230 is less than the threshold value.

In operation 505, the processor 220 may detect a belt slip when the difference value accumulated and stored in the memory 230 is equal to or more than the threshold value. For example, the processor 220 may determine that the belt slip occurred, when the accumulated and stored difference value is equal to or more than the threshold value. In accordance with an embodiment, the processor 220 may limit at least some of the driving functions of the vehicle, in response to the detection of the belt slip. For example, when a belt slip is detected while the vehicle performs autonomous driving, the processor 220 may stop the autonomous driving. For another example, when a belt slip is detected while the vehicle performs normal driving, the processor 220 may limit the steering assist function of the MDPS. In accordance with an embodiment, the processor 220 may provide information (or alarm) to the driver of the vehicle in response to the detection of the belt slip of the vehicle, the information indicating that the belt slip occurred. For example, the processor 220 may provide the information, indicating that the belt slip occurred, to an external electronic device (e.g. a display or speaker inside the vehicle) through the communication circuit 260, thereby informing the driver of the vehicle that the belt slip occurred.

In operation 507, the processor 220 may synchronize the second steering angle with the first steering angle. For example, when the accumulated difference value is less than the threshold value, the processor 220 may synchronize the two steering angles by dividing the second steering angle by the gear ratio and then matching the division result with the first steering angle from which the torsion angle is subtracted. The processor 220 may perform operation 403 of FIG. 4 again, after synchronizing the second steering angle with the first steering angle.

The term "module" used in this specification may include a unit implemented in hardware, software or firmware. For example, the module may be used interchangeably with the term such as logic, a logical block, a part or a circuit. The module may become the minimum unit or a portion of a part configured as one component or configured to perform one or more functions. In accordance with an embodiment, the module may be implemented in the form of ASIC (Application-Specific Integrated Circuit).

In accordance with various embodiments, each of the above-described components (e.g. module or program) may include a single object or a plurality of objects. In accordance with various embodiments, one or more components or operations among the above-described components may be omitted, or one or more other components or operations may be added. Alternatively or additionally, a plurality of components (e.g. module or program) may be integrated into one component. In this case, the integrated component may perform one or more functions of each of the components in the same or similar manner as or to the one or more functions performed by the corresponding component among the plurality of components before the integration. In accordance with various embodiments, operations performed by a module, a program or another component may be executed sequentially, in parallel, repeatedly or heuristically, one or more of the operations may be executed in a different order or omitted, or one or more other operations may be added.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An electronic device comprising:
a first sensor module configured to measure a first steering angle of a motor driven power steering (MDPS);
a second sensor module configured to measure a second steering angle of a motor of the MDPS;
a memory; and
a processor coupled to the first sensor module, the second sensor module, and the memory,
wherein the processor is configured to, in response to a vehicle being started:
synchronize the first steering angle measured through the first sensor module with the second steering angle measured through the second sensor module, wherein the processor is further configured to synchronize the first and second steering angles by subtracting a torsion angle of a torsion bar from the first steering angle, and synchronizing the first steering angle from which the torsion angle is subtracted with the second steering angle in consideration of a gear ratio;
determine a weight based on a load applied to the MDPS;
apply the weight to a difference value between the first and second steering angles; and
diagnose a status of a belt of the MDPS based on the difference value to which the weight is applied,
wherein the processor is further configured to diagnose the status of the belt of the MDPS by determining that a belt slip has occurred in response to the difference value accumulated and stored in the memory being equal to or greater than a threshold value, and determining that no belt slip has occurred in response to the difference value accumulated and stored in the memory being less than the threshold value.

2. The electronic device of claim 1, wherein the first sensor module comprises a steering angle sensor, and
wherein the second sensor module comprises a hall sensor.

3. The electronic device of claim 1, wherein the MDPS comprises a rack-mounted MDPS (R-MPDS), and
wherein the gear ratio is determined based on a C-factor of the R-MDPS, a lead distance per tooth in a rack bar, and a belt pulley ratio.

4. The electronic device of claim 1, further comprising:
a third sensor module configured to measure a column torque, a yaw value of the vehicle, or lateral acceleration of the vehicle,
wherein the processor is further configured to determine the weight by:
identifying a load applied to the MDPS based on a sensing value of the third sensor module; and
determining the weight based on the identified load, and
wherein a value of the weight decreases as the load applied to the MPDS is increased.

5. The electronic device of claim 1, wherein the process is further configured to apply the weight by:
subtracting the torsion angle of the torsion bar from the first steering angle, calculating a difference value between the first steering angle, from which the torsion angle is subtracted, and the second steering angle;
applying the weight by multiplying the difference value by the weight; and
accumulating and storing the difference value, to which the weight is applied, in the memory.

6. The electronic device of claim 1, wherein the processor is further configured to:
limit at least some of driving functions of the vehicle, in response to determining that the belt slip has occurred; and
synchronize the second steering angle with the first steering angle, in response to determining that no belt slip has occurred.

7. The electronic device of claim 1, further comprising:
a communication circuit coupled to the processor,
wherein the processor is further configured to transmit, in response to determining that the belt slip has occurred, information indicating that the belt slip occurred to an external electronic device through the communication circuit, in order to inform a driver of the vehicle that the belt slip has occurred.

8. A method of operating an electronic device, the method comprising:
synchronizing, by a processor of the electronic device, a first steering angle measured through a first sensor module of the electronic device with a second steering angle measured through a second sensor module of the electronic device, in response to a vehicle being started, wherein the synchronizing of the first and second steering angles comprises subtracting a torsion angle of a torsion bar from the first steering angle, and synchronizing the first steering angle from which the torsion angle is subtracted with the second steering angle in consideration of a gear ratio;
determining, by the processor, a weight based on a load applied to a motor driven power steering (MDPS);
applying, by the processor, the weight to a difference value between the first steering angle and the second steering angle; and
diagnosing, by the processor, a status of a belt of the MDPS based on the difference value to which the weight is applied,
wherein the diagnosing of the status of the belt of the MDPS comprises determining that a belt slip has occurred in response to the difference value accumulated and stored in a memory being equal to or greater than a threshold value, and determining that no belt slip has occurred in response to the difference value accumulated and stored in the memory being less than the threshold value,
wherein the first sensor module is configured to measure the first steering angle of the MDPS, and
wherein the second sensor module is configured to measure the second steering angle of a motor of the MDPS.

9. The method of claim 8, wherein the first sensor module comprises a steering angle sensor, and
wherein the second sensor module comprises a hall sensor.

10. The method of claim 8, wherein the MDPS comprises a rack-mounted MPDS (R-MPDS), and
wherein the gear ratio is determined based on a C-factor of the R-MDPS, a lead distance per tooth in a rack bar, and a belt pulley ratio.

11. The method of claim 8, wherein the deciding of the weight comprises:
identifying, by the processor, a load applied to the MDPS based on a sensing value of a third sensor module of the electronic device; and
deciding, by the processor, the weight based on the identified load,
wherein the third sensor module measures column torque, a yaw value of the vehicle, or lateral acceleration of the vehicle, and
wherein a value of the weight decreases as the load applied to the MPDS is increased.

12. The method of claim 8, wherein the applying of the weight comprises:
subtracting, by the processor, the torsion angle of the torsion bar from the first steering angle;
calculating, by the processor, a difference value between the first steering angle, from which the torsion angle is subtracted, with the second steering angle;
applying, by the processor, the weight by multiplying the weight by the difference value; and
accumulating and storing, by the processor, the difference value, to which the weight is applied, in a memory of the electronic device.

13. The method of claim 8, further comprising:
limiting, by the processor, at least some of driving functions of the vehicle, in response to determining that the belt slip has occurred; and
synchronizing, by the processor, the second steering angle with the first steering angle, in response to determining that no belt slip has occurred.

14. The method of claim 8, further comprising:
transmitting, by the processor, information indicating that the belt slip has occurred to an external electronic device through a communication circuit of the electronic device, in response to determining that the belt slip has occurred, in order to inform a driver of the vehicle that the belt slip has occurred.

15. A non-transitory, computer-readable storage medium storing instructions that, when executed by a processor, cause the processor to:
synchronize a first steering angle measured through a first sensor module of an electronic device with a second steering angle measured through a second sensor module of the electronic device, wherein the processor is further configured to synchronize the first and second steering angles by subtracting a torsion angle of a torsion bar from the first steering angle, and synchronizing the first steering angle from which the torsion angle is subtracted with the second steering angle in consideration of a gear ratio, in response to a vehicle being started;

determine a weight based on a load applied to a motor driven power steering (MDPS);

apply the weight to a difference value between the first steering angle and the second steering angle; and diagnose a status of a belt of the MDPS based on the difference value to which the weight is applied, wherein the processor is further configured to diagnose the status of the belt of the MDPS by determining that a belt slip has occurred in response to the difference value accumulated and stored in the memory being equal to or greater than a threshold value, and determining that no belt slip has occurred in response to the difference value accumulated and stored in the memory being less than the threshold value, wherein the first sensor module is configured to measure the first steering angle of the MDPS, and wherein the second sensor module is configured to measure the second steering angle of a motor of the MDPS.

* * * * *